United States Patent [19]

Tschelisnik

[11] 4,157,627
[45] Jun. 12, 1979

[54] FISHING LINE FLOAT WITH ELECTRIC FLASHLIGHT

[76] Inventor: Rudolf Tschelisnik, Grossfriedrichsburger Strasse 8, 8000 Munchen 82, Fed. Rep. of Germany

[21] Appl. No.: 807,993

[22] Filed: Jun. 20, 1977

[30] Foreign Application Priority Data

Jun. 23, 1976 [DE] Fed. Rep. of Germany ....... 2628030

[51] Int. Cl.$^2$ .............................................. A01K 93/00
[52] U.S. Cl. ......................................... 43/17; 43/17.5
[58] Field of Search .................. 43/16, 17, 17.5, 17.6; 200/84 R, 84 B, 61.51, 61.53; 362/109

[56] References Cited

U.S. PATENT DOCUMENTS

| 1,529,949 | 3/1925 | Good | 43/17 |
|---|---|---|---|
| 2,306,921 | 12/1942 | Wilcox | 200/84 R X |
| 2,448,681 | 9/1948 | Nutter | 43/17 |
| 2,517,479 | 8/1950 | Grimm | 43/17 |
| 2,542,132 | 2/1951 | Goertzen | 43/17 X |
| 3,421,246 | 1/1969 | Jinushi | 43/17.5 |
| 3,437,770 | 4/1969 | Piernik | 200/84 R X |
| 4,070,784 | 1/1978 | Yokogawa | 43/17.5 |

FOREIGN PATENT DOCUMENTS

| 1296452 | 5/1969 | Fed. Rep. of Germany | 43/17 |
|---|---|---|---|
| 2631238 | 2/1977 | Fed. Rep. of Germany | 43/17.5 |
| 974684 | 11/1964 | United Kingdom | 43/17 |

*Primary Examiner*—Nicholas P. Godici
*Attorney, Agent, or Firm*—Sughrue, Rothwell, Mion, Zinn & Macpeak

[57] ABSTRACT

An electrically conductive floating body having a slightly higher specific weight than that of water is carried within the immersed lower end of a tubular hollow float coupled to one end of a fishing line such that the fish in submerging the hollow float causes the electrically conductive floating body to close contacts between a battery and an illuminating diode carried by the hollow float above the surface of the water.

5 Claims, 2 Drawing Figures

FISHING LINE FLOAT WITH ELECTRIC FLASHLIGHT

BACKGROUND OF THE INVENTION

Field of the Invention

This invention relates to fishing line floats which incorporate an electric flashlight to indicate the taking of the bait by the fish from the hook at the end of the line remote from the float. Such floats normally contain the hollow float housing and incorporating within the same an electric battery, an illuminating element, a switching mechanism which connects the battery and the illuminating element in series as well as a hollow float part incorporated within the water displacement body which opens towards the water and which operates the switching means.

One such float is illustrated in British Pat. No. 835,140. The water displacement body constitutes in that patent a float which compresses two switching contacts via a membrane. The rest position of the float is determined by the surface of the water so that in the case of the float submerging to a variable depth, the sensitivity of response differs.

German Utility Pat. No. 6923633 shows another type of float in which the operating member for the switch is provided outside of the float and is closed in a watertight manner but is connected with the fishing line, whereby in case of a pull on the fishing line, there is effected the switching on of a light located in the float head. This type of float is relatively heavy and is also too insensitive in making contact in order to guarantee a fine response to even a slight tug of the fishing line.

German Pat. No. 1296452 employs an electric flashlight operated in accordance with a mercury switch provided within the float housing. This float too is cumbersome in terms of its illumination system and beyond that is heavy and relatively complicated in its structure.

By way of Swiss Pat. No. 254727, it is known to make an annular float consisting of wood electrically conductive on its surface and thus in the case of upward movement of the float, the conductive surface closes contacts for switching on of a light bulb. In this case too, sensitivity of response of the switch is dependent upon the depth of immersion of the float, providing problems.

SUMMARY OF THE INVENTION

The present invention is based on the task of creating a float of the initially described type which is light and simple in its structure and which makes possible the initiation of a light flash independently of the depth of immersion of the float, even in response to a slight tug on the fishing line.

According to the invention, the problem is solved through the fact that the hollow float part is provided at the lower end of the float and that the water displacement body constitutes an electrically conductive hovering body whose specific weight is slightly larger than that of water, and which in the case of a submerging movement of the float in response to a tug on the fishing line, acts to close two contacts which project into the lower, hollow part of the float. Since the floating part is always encased by water, the operation of the switch takes place independently of variable loads or depth of immersion of the float.

As a result of this structure, it is possible to convert even slight movements of the float in the water, as are caused by the pull of the fishing line, into contact closing, whereby the contact is again opened subsequently in a simple and safe manner. Thus, flash illumination results even for slight pulling forces on the fishing line.

The float according to the present invention is furthermore developed advantageously in such a way that in its state of rest, the conductive floating body rests on an annular collar in the lower, hollow part of the float. In the case of a pull on the fishing line, the float attached thereto submerges more deeply into the water, whereby the conductive floating body does not participate in this downward movement because of its inertia and as a result is capable of bridging the contacts projecting into the hollow float part above that conductive floating body. In the wall of the lower, hollow float part, above the area of the contacts, compensating apertures are provided which effectively influence the function of the float body advantageously.

The illuminating element of the float of the invention may effectively constitute a flash diode. The flash diode is small and light in its construction and has a slight consumption of current so that the float equipped with a flash diode as the illuminator is not only very light but also has a long useful life.

The electric battery may advantageously comprise a miniature battery housed above the lower hollow float part. Such construction also leads to a further decrease in the weight of the float.

Advantageously, the lower, hollow float part is connected by a plug connection in a sealing and rotatable manner, with the upper hollow sealed float part in which the battery and flash element are disposed, at the same time contacts are provided effectively to achieve the conductive sequence between the battery illuminating element and the switching means in the area of the plug connection which contacts may be opened and closed by rotating the lower float part vis-a-vis the upper float part. Thus, the float can be disconnected in a very simple manner so that even in the case of contact closing by the float body, no flow of current occurs. This in turn contributes to the extended durability of the float incorporating the electric flashlight.

In the case of a preferred embodiment by way of example, the float in condition for use weighs about 5 to 6 grams. This extraordinary low weight is possible only as a result of the construction of the float according to the invention.

An embodiment of the float with an electric flashlight operating in accordance with the invention is shown in the drawings and is described in greater detail in the following paragraphs.

DESCRIPTION OF THE PREFERRED EMBODIMENT

Figure 1:
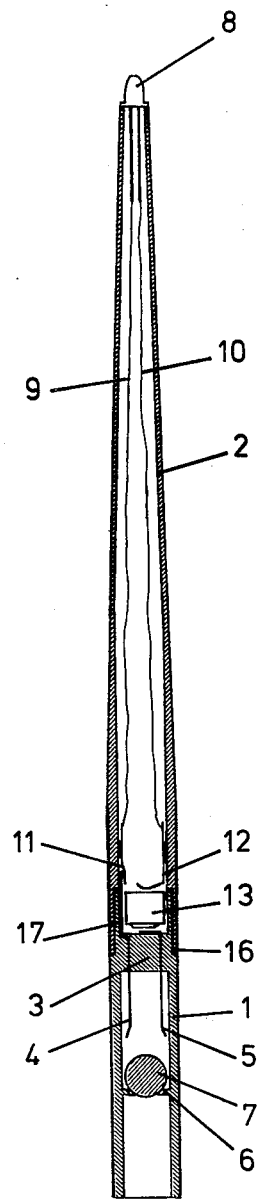
FIG. 1 is a longitudinal sectional view of a float incorporating the flashlight system of the present invention.

The float incorporating the electric flashlight constituting the present invention as shown in the drawings consists of a lower float part 1 and an upper float part 2. Both parts are tubular, the lower float part 1 takes the form of a tube which is open at its lower end and is closed at its upper end by an end wall 3. Two contacts 4 and 5 which are spaced relative to each other project through the end wall 3 into the hollow, lower part 1 of the float.

In the hollow, lower part 1 of the float, an annular collar 6 is provided spaced axially from the end wall 3 on which a spherical, electrically conductive floating body 7 normally rests. The diameter of the body 7 is slightly in excess of the diameter of collar 6 but is smaller than the internal diameter of the tube forming the lower float part 1.

The electrically conductive floating body 7 has a specific weight which is slightly higher than that of water. With the float submerged in water, the float body 7 rests on the annular collar 6 as long as the float is not moved. As soon as the float executes a movement downwardly in consequence of a pull on the fishing line (not shown) from below, the float body 7 drifts upwards and bridges the spaced contacts 4 and 5. The contacts 4 and 5 at their free ends, projecting into the float part 1, are bent slightly outwardly away from each other in order to receive the spherical float body 7 as it drifts up in an advantageous way to insure closure of the circuit completed by the float body 7 and contacts 4 and 5.

After the float body 7 has electrically bridged contacts 4 and 5, and the pull of the line ceases, the float again rises in the water, whereby the conductive floating body 7 does not participate in this movement because of its inertia, as a result of which bridging between the contacts 4 and 5 ceases and the float body 7 descends to its starting position resting on annular collar 6.

In the area of contacts 4 and 5 in the lower, hollow float part 1, one or more compensating apertures 18 are provided to insure that no air bubbles collect in the lower, hollow float part 1 and that no pressure head develops which could impede the contact closing or contact opening characteristics of float body 7.

Figure 2:
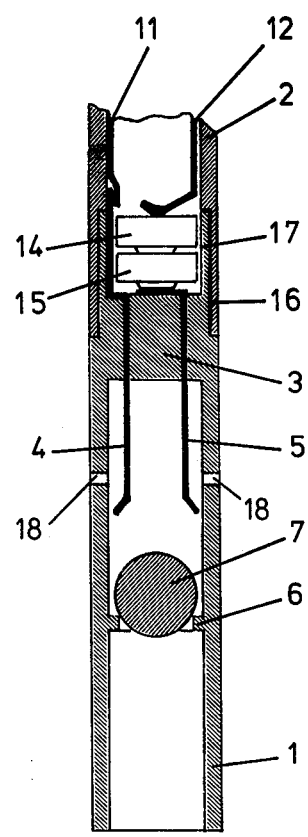
FIG. 2 is an enlarged longitudinal section of but a portion of that shown in FIG. 1.

In the upper, likewise hollow float part 2 which is also tubular in form, and which terminates in a narrow point at its upper end, an illuminating diode 8 is disposed, the diode constituting the lamp or light for the float. The illuminating diode 8 is connected via two leads 9 and 10 with two additional contacts 11 and 12 in the lower end of the upper part 2 of the float. Contact 11 is connected with contact 4 in the lower float part 1, while contact 12 leads to one pole of a miniature battery 13. The other pole of the miniature battery 13 is connected to contact 5 in the lower part 1 of the float. As shown in FIG. 2, the miniature battery 13 may consist of two cells 14 and 15 disposed in series.

The lower part 1 of the float and the upper part 2 of the float are interconnected by way of a sealing and rotatable plug connection. The plug connection is established by an outside tube part 16 at the lower end of the upper float part 2 which telescopes over and inside tube part 17 at the upper end of the lower float part 1. The two tube parts 16 and 17 are seated within each other in a sealing manner so that a tight closure for the hollow, upper float part 2 is formed.

The lower float part 1 may be twisted when connecting the lower part 1 of the float to the upper part 2 of the float. In this respect, both the upper and lower parts carry recesses at their contacting ends on their outer peripheries receiving the outside tube part 16. Further, by twisting the two float parts 1 and 2 relative to each other, contacts 4 and 11 may be connected to each other, and in this condition the float is ready to effect illumination by energization of diode 8, and under these conditions illumination occurs by the simple act of bridging of contacts 4 and 5 by float body 7.

Whenever the lower part 1 of the float and the upper float part 2 are twisted relative to each other in such a way that contact between contact 4 in the lower float part and contact 11 in the upper float part is interrupted, then the circuit between the illuminating diode 8 and the battery or batteries is broken, the circuit cannot be completed even in the case of bridging of contacts 4 and 5 by the float body 7. The illuminating diode 8 cannot be switched on and no delivery of current by miniature battery 13 can be effected. Therefore, there is a possibility of safely separating the flash circuit of the float in a simple manner in case of non-use. Also, the float may be operated without flash indication whenever such operation is desired.

The lower float part 1 and the upper float part 2 are formed effectively of plastic. The upper float part 2 may be of conical configuration tapering from the lower end towards the illuminating diode 8. In the case of an embodiment given by way of example of the described float, the weight of the float in its condition ready for use, that is equipped with a miniature battery 13 and a diode 8, may be on the order of 5 to 6 grams. This light weight also contributes to the long, useful life and very good response sensitivity of the float in case of blinking switching of the diode 8 by operation of float body 7.

Of course, instead of the float body 7 being spherical, the float body 7 may take the form of a cube. However, the ball shaped floating body is used in preference since there is special problem of alignment with respect to the hollow tube within which it resides.

While the invention has been particularly shown and described with reference to a preferred embodiment thereof, it will be understood by those skilled in the art that various changes in form and details may be made therein without departing from the spirit and scope of the invention.

What is claimed is:

1. In a float for electrical flash illumination as a result of movement or pull of a fishing line fixed to the float and bearing a hook at its opposite end, said float comprising a hollow float housing and having an electric battery connected in series to an electrical illuminating element and having a hollow float part in the direction towards the water and supporting therein a water displacement body to operate said switching means, the improvement comprising:

said hollow float part being provided at the lower end of the float, said switching means comprising contact means projecting into the lower, hollow float part, and said water displacement body comprising an electrically conductive floating body with a slightly higher specific weight than that of water and carried within said lower hollow float part at a point below the water surface so as to be always encased in water, in operative position with respect to said contact means and operable to close said circuit between said electric battery and said illuminating element, by contact with said electrically conductive floating body.

2. The float as claimed in claim 1, wherein said lower, hollow float part is tubular in form and is provided with an annular collar internally of said tube, said contact means comprises two contacts projecting into the interior of said lower, hollow float part tube at a position above said annular collar and said conductive float body comprises a sphere.

3. The float as claimed in claim 1, wherein said lower, hollow float part at its top in the area of said contact means comprises apertures to prevent air entrapment therein.

4. The float as claimed in claim 2, wherein said float comprises upper and lower hollow float parts, said parts being connected by a sealingly rotatable plug connection with said battery and illuminating element being disposed within said upper hollow float part.

5. The float as claimed in claim 4, further comprising contact means provided by said plug connection constituting a rotatable switching arrangement such that the circuit including the battery and illuminating element may be selectively opened and closed by rotation of the lower, hollow float part with respect to the upper float part.

* * * * *